US012352862B2

(12) United States Patent
Chen et al.

(10) Patent No.: US 12,352,862 B2
(45) Date of Patent: Jul. 8, 2025

(54) LIDAR-BASED TRAILER TRACKING

(71) Applicant: Waymo LLC, Mountain View, CA (US)

(72) Inventors: Mingcheng Chen, Sunnyvale, CA (US); Christian Lauterbach, Campbell, CA (US); Benjamin Pitzer, East Palo Alto, CA (US); Peter Morton, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 518 days.

(21) Appl. No.: 17/411,120

(22) Filed: Aug. 25, 2021

(65) Prior Publication Data

US 2021/0382174 A1   Dec. 9, 2021

Related U.S. Application Data

(63) Continuation of application No. 16/214,838, filed on Dec. 10, 2018, now Pat. No. 11,125,881.

(51) Int. Cl.
*G01S 17/66* (2006.01)
*B60W 10/04* (2006.01)
(Continued)

(52) U.S. Cl.
CPC ............ *G01S 17/66* (2013.01); *B60W 10/04* (2013.01); *B60W 10/20* (2013.01);
(Continued)

(58) Field of Classification Search
CPC .......... G01S 17/66; G01S 17/42; G01S 17/88; G01S 17/86; G01S 17/87; G01S 17/89;
(Continued)

(56) References Cited

U.S. PATENT DOCUMENTS 7,904,222 B2   3/2011   Lee et al.
9,315,212 B1   4/2016   Kyrtsos et al.
(Continued)

FOREIGN PATENT DOCUMENTS

CN   106247590 A   1/2016
EP     3029929 A1   6/2016
JP    2001191964 A   7/2001

OTHER PUBLICATIONS

The Extended European Search Report for European Patent Application No. 19896166.6, Jun. 24, 2022.
(Continued)

*Primary Examiner* — Tarek Elarabi
(74) *Attorney, Agent, or Firm* — Botos Churchill IP Law LLP

(57) ABSTRACT

The technology relates to autonomous vehicles having articulating sections such as the trailer of a tractor-trailer. Aspects include approaches for tracking the pose of the trailer, including its orientation relative to the tractor unit. Sensor data is analyzed from one or more onboard sensors to identify and track the pose. The pose information is usable by on-board perception and/or planning systems when driving the vehicle in an autonomous mode. By way of example, on-board sensors such as Lidar sensors are used to detect the real-time pose of the trailer based on Lidar point cloud data. The orientation of the trailer is estimated based on the point cloud data, and the pose is determined according to the orientation and other information about the trailer. Aspects also include determining which side of the trailer the sensor data is coming from. A camera may also detect trailer marking information to supplement the analysis.

21 Claims, 15 Drawing Sheets

(51) Int. Cl.
  *B60W 10/20* (2006.01)
  *B60W 30/18* (2012.01)
  *G01S 17/42* (2006.01)
  *G01S 17/88* (2006.01)
  *G05D 1/00* (2024.01)

(52) U.S. Cl.
  CPC ....... *B60W 30/18009* (2013.01); *G01S 17/42* (2013.01); *G01S 17/88* (2013.01); *G05D 1/0238* (2013.01); *B60W 2300/145* (2013.01); *B60W 2400/00* (2013.01); *B60W 2420/403* (2013.01); *B60W 2420/408* (2024.01); *B60W 2520/22* (2013.01); *B60W 2554/00* (2020.02); *B60W 2710/20* (2013.01); *B60W 2720/106* (2013.01)

(58) Field of Classification Search
  CPC ..... G01S 17/931; B60W 10/04; B60W 10/20; B60W 30/18009; B60W 2300/145; B60W 2400/00; B60W 2420/42; B60W 2420/52; B60W 2520/22; B60W 2710/20; B60W 2720/106; B60W 2050/0052; B60W 2300/10; B60W 2300/12; B60W 40/10; B60W 2420/403; B60W 2420/408; G05D 1/0238; G05D 2201/0213
  See application file for complete search history.

(56) References Cited

U.S. PATENT DOCUMENTS

| | | | |
|---|---|---|---|
| 9,558,409 | B2 | 1/2017 | Pliefke et al. |
| 10,450,002 | B2* | 10/2019 | Williams ............... B60P 3/1033 |
| 11,200,430 | B2* | 12/2021 | Luo ........................... G06T 7/73 |
| 2006/0089763 | A1 | 4/2006 | Barrett et al. |
| 2006/0244579 | A1 | 11/2006 | Raab |
| 2009/0005932 | A1 | 1/2009 | Lee et al. |
| 2011/0210529 | A1 | 9/2011 | Markstaller |
| 2014/0358417 | A1* | 12/2014 | Lavoie ................... B60K 35/10 |
| | | | 701/300 |
| 2015/0217693 | A1 | 8/2015 | Pliefke et al. |
| 2016/0368336 | A1 | 12/2016 | Kahn et al. |
| 2017/0361844 | A1 | 12/2017 | Kahn et al. |
| 2018/0056868 | A1 | 3/2018 | Naserian et al. |
| 2018/0057052 | A1 | 3/2018 | Dodd et al. |
| 2018/0121742 | A1 | 5/2018 | Son et al. |
| 2018/0319470 | A1* | 11/2018 | Williams ......... B60W 30/18036 |
| 2019/0353478 | A1 | 11/2019 | Deng et al. |
| 2020/0143174 | A1* | 5/2020 | Luo .......................... B60D 1/62 |

OTHER PUBLICATIONS

Cameron, "An Introduction to LIDAR: The Key Self-Driving Car Sensor", Voyage, 2017, pp. 1-16.
International Search Report and Written Opinion for application No. PCT/US2019/061983 dated Mar. 18, 2020.
First Office Action for corresponding Chinese Ap ofication No. 201980081504.1 dated Jun. 28, 2023 (19 pages).

* cited by examiner

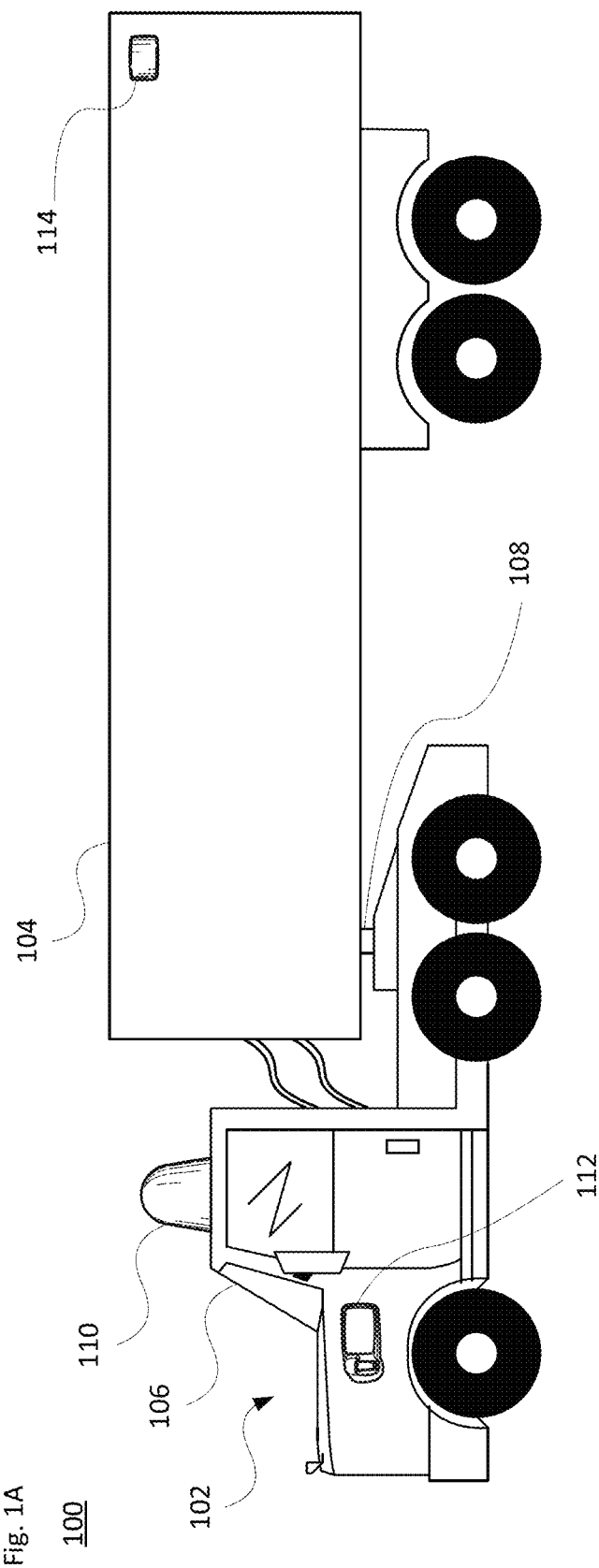

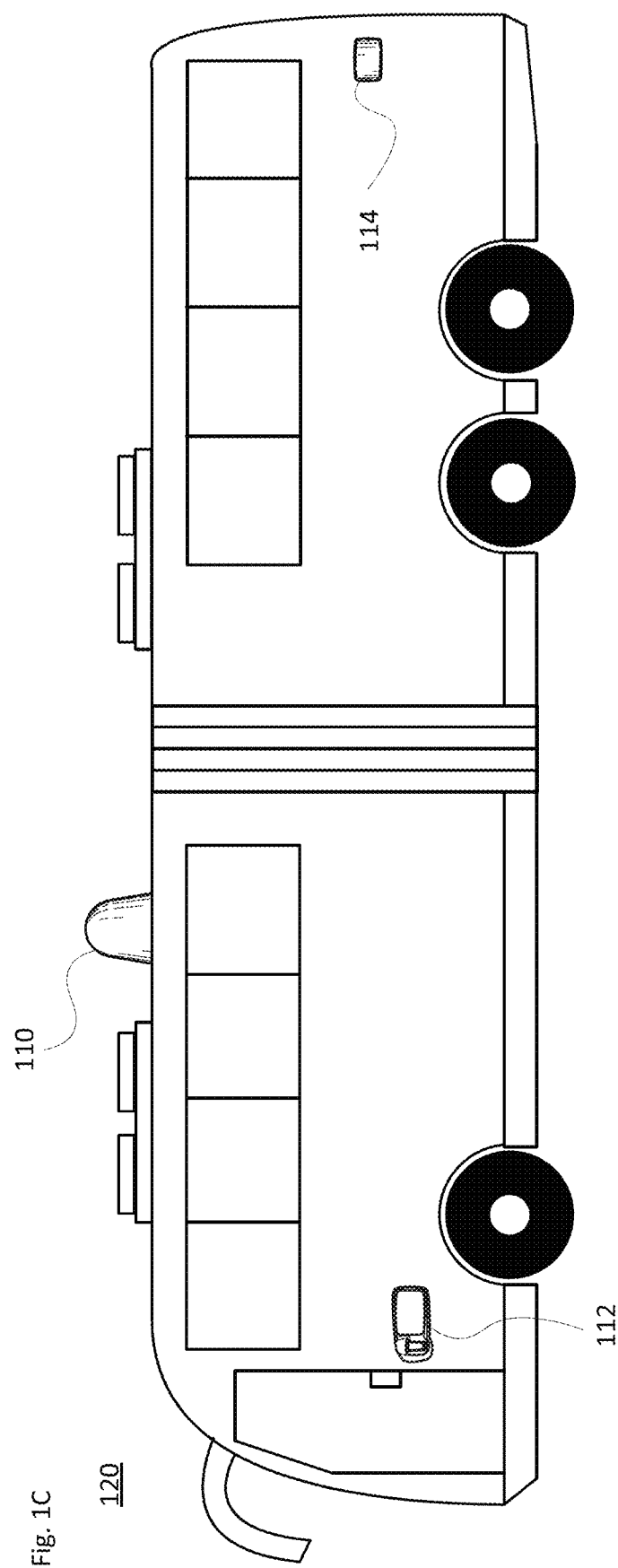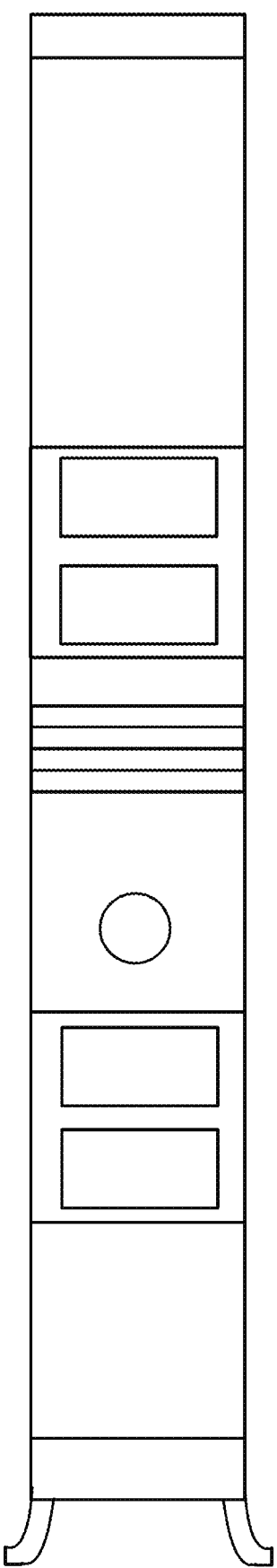
Fig. 1C
Fig. 1D

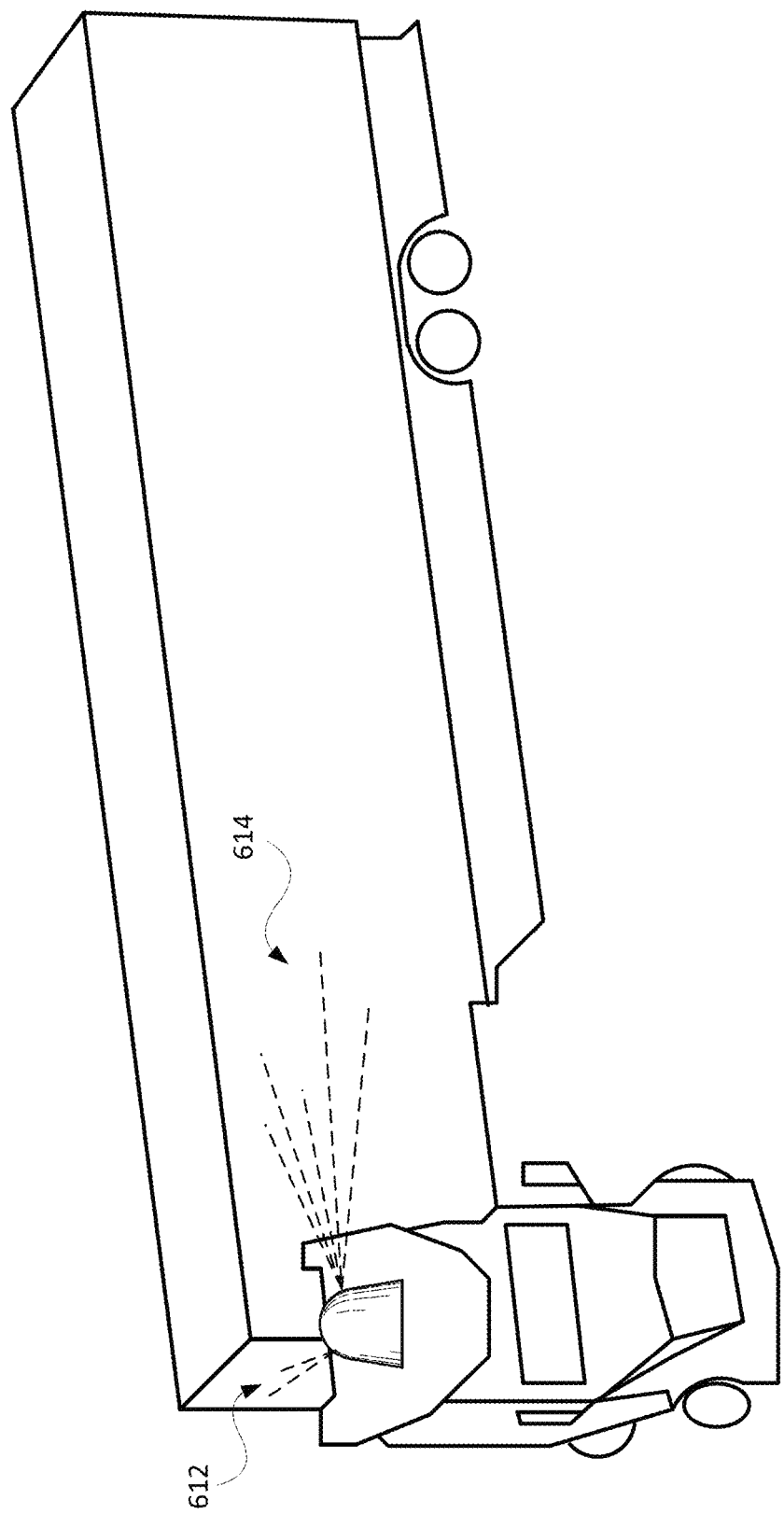

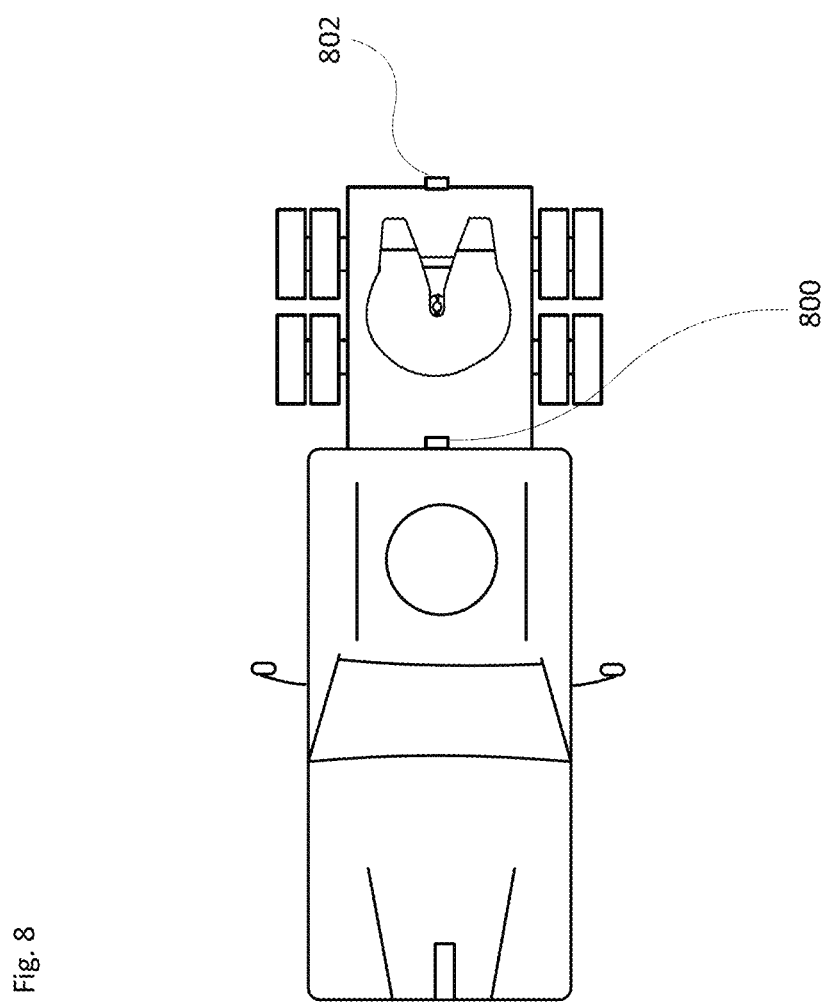

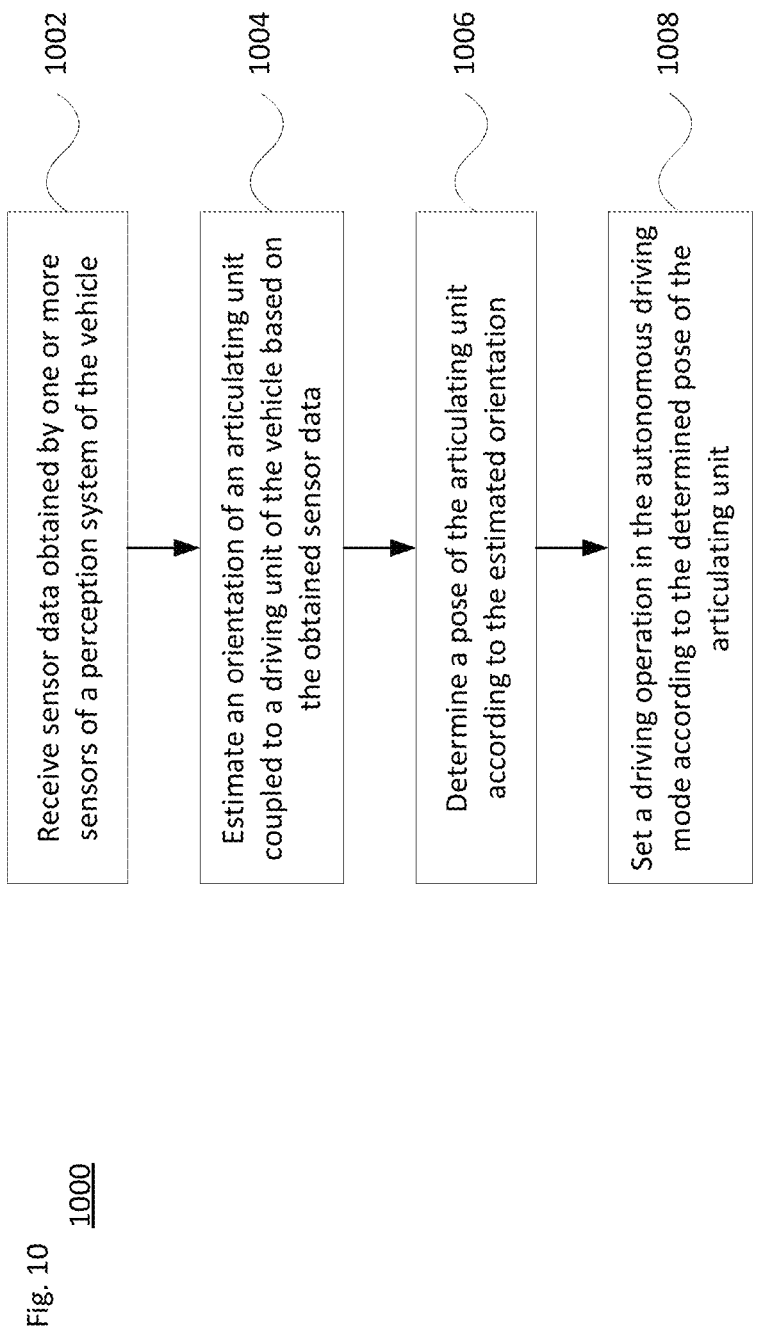

LIDAR-BASED TRAILER TRACKING

CROSS-REFERENCE TO RELATED APPLICATIONS

This application is a continuation of U.S. application Ser. No. 16/214,838, filed Dec. 10, 2018, the entire disclosure of which is incorporated by reference herein.

BACKGROUND

Autonomous vehicles, such as vehicles that do not require a human driver, can be used to aid in the transport of trailered (e.g., towed) cargo, such as freight, livestock or other items from one location to another. Other types of articulated vehicles may also transport cargo or passengers. Such vehicles may operate in a fully autonomous mode without any in-vehicle passenger input or a partially autonomous mode where a person may provide some driving input. When making turns in these modes, the trailer portion of the vehicle may not be aligned with the tractor portion. It is possible to detect or estimate the positioning of the trailer through various techniques. However, such techniques may not be sufficiently accurate to the extent necessary to operate in an autonomous mode. The techniques can also be adversely affected by sensor signal information that varies depending on the orientation of the trailer relative to the tractor as the vehicle turns.

BRIEF SUMMARY

The technology described herein provides systems and methods for tracking the pose of a trailer or other articulated element of a vehicle that can operate in a fully or partially autonomous driving mode. Aspects include analyzing sensor data from one or more onboard Lidar sensors to identify and track the pose. The received Lidar data points that are returned from the trailer can be correctly identified to avoid interpretation as coming from another object in the surrounding environment. The resultant pose information may be used by on-board perception and/or planning systems when driving in the autonomous mode.

According to aspects of the technology, a vehicle is configured to operate in an autonomous driving mode. The vehicle comprising a driving unit that includes a driving system, a perception system, a coupling system and a control system. The driving system includes a steering subsystem, an acceleration subsystem and a deceleration subsystem to control driving of the vehicle in the autonomous driving mode. The perception system includes one or more sensors configured to detect objects in an environment surrounding the vehicle based on obtained sensor data. The coupling system is configured to pivotally couple to an articulating unit. The control system is operatively connected to the driving system and the perception system. The control system has one or more computer processors configured to receive sensor data from the perception system and to direct the driving system when operating in the autonomous driving mode based on the sensor data received from the perception system. At least one of the control system and the perception system is further configured to estimate an orientation of the articulating unit based on the obtained sensor data and determine a pose of the articulating unit according to the estimated orientation.

The at least one of the control system and the perception system may be further configured to smooth the estimated orientation of the articulating unit with a motion filter. Here, the pose of the articulating unit is determined according to the smoothed estimated orientation. Determination of the pose of the articulating unit may include evaluation of the smoothed estimated orientation based on at least one of a length of the articulating unit, a hitch point position along the articulating unit, or a tow point position along the driving unit.

In one example, the one or more sensors includes a Lidar sensor disposed on a roof of the driving unit. The Lidar sensor is configured to have up to a 360° field of view.

In another example, at least one of the control system and the perception system is further configured to determine a major face of the articulating unit from the obtained sensor data. The determination of the major face may include an evaluation of whether a detected surface of the articulating unit is a front surface or a side surface according to a comparison of obtained data points closest to and farthest from a given one of the one or more sensors.

The one or more sensors may include a Lidar sensor and a camera. In this case, the camera may be disposed between a cab of the driving unit and the articulating unit. The vehicle may further comprising the articulating unit. The articulating unit has one or more alignment marks disposed along a front face, a left side face and a right side face thereof. Here, the camera is configured to detect the one or more alignment marks. At least one of the control system and the perception system is configured to determine the pose of the articulating unit based on the detection of the one or more alignment marks.

In a further example, the vehicle is a tractor-trailer. In this case, the driving unit is a tractor unit, and the articulating unit is a trailer. The trailer has a kingpin pivotally connected to a fifth-wheel of the tractor unit. The one or more sensors may include a Lidar sensor disposed on a roof of the tractor unit. In this case, the sensor data may be Lidar point cloud data.

And in yet another example, the control system may be further configured to set a driving operation according to the determined pose of the articulating unit.

According to other aspects of the technology, a method of operating a vehicle in an autonomous driving mode is provided. The method comprises receiving sensor data obtained by one or more sensors of a perception system of the vehicle; estimating, by one or more processors of the vehicle, an orientation of an articulating unit coupled to a driving unit of the vehicle based on the obtained sensor data; determining, by the one or more processors, a pose of the articulating unit according to the estimated orientation; and setting a driving operation in the autonomous driving mode according to the determined pose of the articulating unit.

The method may further comprise smoothing, by the one or more processors, the estimated orientation of the articulating unit with a motion filter. In this case, the pose of the articulating unit is determined according to the smoothed estimated orientation. Here, determining the pose of the articulating unit may include evaluating the smoothed estimated orientation based on at least one of a length of the articulating unit, a hitch point position along the articulating unit, or a tow point position along the driving unit.

The method may also include determining a major face of the articulating unit from the obtained sensor data. Determining the major face may include evaluating whether a detected surface of the articulating unit is a front surface or a side surface according to a comparison of obtained data points closest to and farthest from a given one of the one or more sensors. Evaluating whether the detected surface of the articulating unit is the front surface or the side surface may include first determining that the detected surface is not the front surface, and then determining whether the detected surface is a right side surface or a left side surface.

The method may alternatively comprise detecting one or more alignment marks on one or more faces of the articulating unit. Here, determining the pose of the articulating unit is further based on the detecting of the one or more alignment marks.

BRIEF DESCRIPTION OF THE DRAWINGS

FIGS. 1A-B illustrate an example tractor-trailer arrangement for use with aspects of the technology.

FIGS. 1C-D illustrate an example articulated bus arrangement for use with aspects of the technology.

FIGS. 6A-B illustrate turning scenario examples in accordance with aspects of the disclosure.

FIG. 8 illustrates example locations for a flight camera or depth camera in accordance with aspects of the disclosure.

FIG. 10 illustrates an example method in accordance with aspects of the disclosure.

DETAILED DESCRIPTION

Overview

Figure 2A:
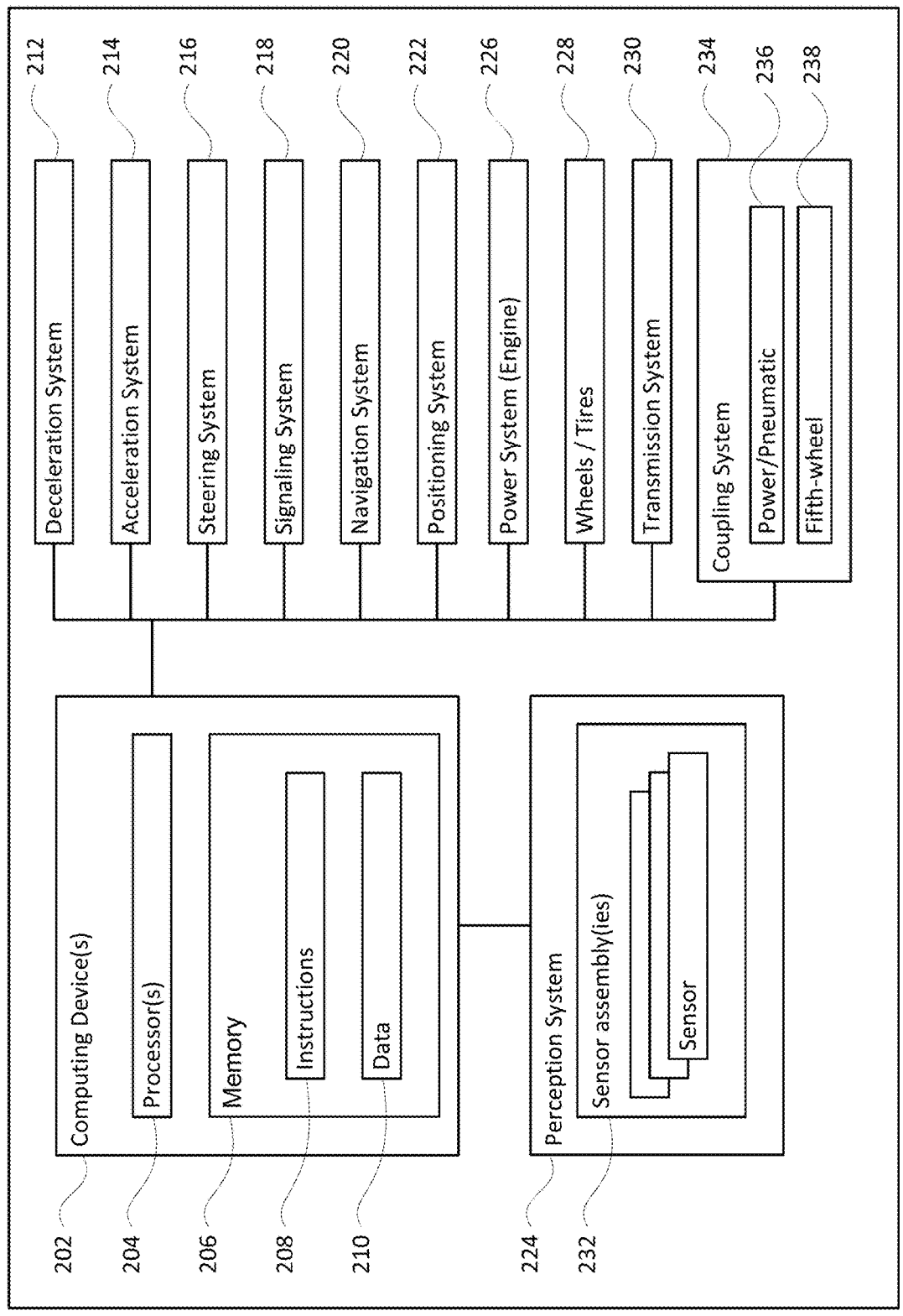
FIG. 2A illustrates a system diagram of an autonomous vehicle control system in accordance with aspects of the disclosure.

The technology relates to fully autonomous or semi-autonomous vehicles, including tractor-trailer or other articulated vehicles. On-board sensors, such as Lidar sensors, are used to detect the real-time pose of the trailer or articulated portion of the vehicle. The orientation of the trailer or other articulated portion is estimated based on received sensor data, and the pose is determined according to the orientation and other information about the trailer/articulated portion. Aspects also involve determining which side, or "face" of the trailer/articulated portion the sensor data (e.g., Lidar point cloud) is coming from. These and other aspects are discussed in detail below.

FIGS. 1A-B illustrate an example vehicle 100, such as a tractor-trailer truck. The truck may include, e.g., a single, double or triple trailer, or may be another medium or heavy duty truck such as in commercial weight classes 4 through 8. As shown, the truck includes a tractor unit 102 and a single cargo unit or trailer 104. The trailer 104 may be fully enclosed, open such as a flat bed, or partially open depending on the type of cargo to be transported. The tractor unit 102 includes the engine and steering systems (not shown) and a cab 106 for a driver and any passengers. In a fully autonomous arrangement, the cab 106 may not be equipped with seats or manual driving components, since no person may be necessary.

The trailer 104 includes a hitching point, known as a kingpin, 108. The kingpin 108 is typically formed as a solid steel shaft, which is configured to pivotally attach to the tractor unit 102. In particular, the kingpin 108 attaches to a trailer coupling 110, known as a fifth-wheel, that is mounted rearward of the cab. For a double or triple tractor-trailer, the second and/or third trailers may have simple hitch connections to the leading trailer. Or, alternatively, according to one aspect of the disclosure, each trailer may have its own kingpin. In this case, at least the first and second trailers could include a fifth-wheel type structure arranged to couple to the next trailer.

As shown, the tractor may have one or more sensor units 110, 112 disposed therealong. For instance, one or more sensor units 110 may be disposed on a roof or top portion of the cab 106, and one or more side sensor units 112 may be disposed on left and/or right sides of the cab 106. Sensor units may also be located along other regions of the cab 106, such as along the front bumper or hood area, in the rear of the cab, adjacent to the fifth-wheel, underneath the chassis, etc. The trailer 104 may also have one or more sensor units 114 disposed therealong, for instance along a side panel, front, rear, roof and/or undercarriage of the trailer 104. FIGS. 1C-D illustrate an example of another type of articulated vehicle 120, such as an articulated bus. As with the tractor-trailer 100, the articulated bus 120 may include one or more sensor units disposed along different areas of the vehicle. By way of example, as discussed further below each sensor unit may include one or more sensors, such as Lidar, radar, camera (e.g., optical or infrared), acoustical (e.g., microphone or sonar-type sensor), inertial (e.g., accelerometer, gyroscope, etc.) or other sensors.

Example Systems

FIG. 2A illustrates a block diagram 200 with various components and systems of a vehicle, such as a truck, farm equipment or construction equipment, configured to operate in a fully or semi-autonomous mode of operation. By way of example, there are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. Level 2 has partial automation of certain driving operations, while Level 3 involves conditional automation that can enable a person in the driver's seat to take control as warranted. In contrast, Level 4 is a high automation level where the vehicle is able to drive without assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as "autonomous" driving modes. Thus, reference to an autonomous driving mode includes both partial and full autonomy.

As shown in the block diagram of FIG. 2A, the vehicle includes a control system of one or more computing devices, such as computing devices 202 containing one or more processors 204, memory 206 and other components typically present in general purpose computing devices. The control system may constitute an electronic control unit (ECU) of a tractor unit. The memory 206 stores information accessible by the one or more processors 204, including instructions 208 and data 210 that may be executed or otherwise used by the processor 204. The memory 206 may be of any type capable of storing information accessible by the processor, including a computing device-readable medium. The memory is a non-transitory medium such as a hard-drive, memory card, optical disk, solid-state, tape memory, or the like. Systems may include different combinations of the foregoing, whereby different portions of the instructions and data are stored on different types of media.

The instructions 208 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. The data 210 may be retrieved, stored or modified by one or more processors 204 in accordance with the instructions 208. As an example, data 210 of memory 206 may store information, such as calibration information, to be used when calibrating different types of sensors.

The one or more processor 204 may be any conventional processors, such as commercially available CPUs. Alternatively, the one or more processors may be a dedicated device such as an ASIC or other hardware-based processor. Although FIG. 2A functionally illustrates the processor(s), memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may form an autonomous driving computing system incorporated into vehicle 100. The autonomous driving computing system may capable of communicating with various components of the vehicle in order to perform route planning and driving operations. For example, the computing devices 202 may be in communication with various systems of the vehicle, such as a driving system including a deceleration system 212 (for controlling braking of the vehicle), acceleration system 214 (for controlling acceleration of the vehicle), steering system 216 (for controlling the orientation of the wheels and direction of the vehicle), signaling system 218 (for controlling turn signals), navigation system 220 (for navigating the vehicle to a location or around objects) and a positioning system 222 (for determining the position of the vehicle).

The computing devices 202 are also operatively coupled to a perception system 224 (for detecting objects in the vehicle's environment), a power system 226 (for example, a battery and/or gas or diesel powered engine) and a transmission system 230 in order to control the movement, speed, etc., of the vehicle in accordance with the instructions 208 of memory 206 in an autonomous driving mode which does not require or need continuous or periodic input from a passenger of the vehicle. Some or all of the wheels/tires 228 are coupled to the transmission system 230, and the computing devices 202 may be able to receive information about tire pressure, balance and other factors that may impact driving in an autonomous mode.

The computing devices 202 may control the direction and speed of the vehicle by controlling various components. By way of example, computing devices 202 may navigate the vehicle to a destination location completely autonomously using data from the map information and navigation system 220. Computing devices 202 may use the positioning system 222 to determine the vehicle's location and the perception system 224 to detect and respond to objects when needed to reach the location safely. In order to do so, computing devices 202 may cause the vehicle to accelerate (e.g., by increasing fuel or other energy provided to the engine by acceleration system 214), decelerate (e.g., by decreasing the fuel supplied to the engine, changing gears (e.g., via the transmission system 230), and/or by applying brakes by deceleration system 212), change direction (e.g., by turning the front or other wheels of vehicle 100 by steering system 216), and signal such changes (e.g., by lighting turn signals of signaling system 218). Thus, the acceleration system 214 and deceleration system 212 may be a part of a drivetrain or other transmission system 230 that includes various components between an engine of the vehicle and the wheels of the vehicle. Again, by controlling these systems, computing devices 202 may also control the transmission system 230 of the vehicle in order to maneuver the vehicle autonomously.

As an example, computing devices 202 may interact with deceleration system 212 and acceleration system 214 in order to control the speed of the vehicle. Similarly, steering system 216 may be used by computing devices 202 in order to control the direction of vehicle. For example, if the vehicle is configured for use on a road, such as a tractor-trailer truck or a construction vehicle, the steering system 216 may include components to control the angle of wheels of the tractor unit to turn the vehicle. Signaling system 218 may be used by computing devices 202 in order to signal the vehicle's intent to other drivers or vehicles, for example, by lighting turn signals or brake lights when needed.

Navigation system 220 may be used by computing devices 202 in order to determine and follow a route to a location. In this regard, the navigation system 220 and/or data 210 may store map information, e.g., highly detailed maps that computing devices 202 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line.

The perception system 224 also includes one or more sensors or other components for detecting objects external to the vehicle such as other vehicles, obstacles in the roadway, traffic signals, signs, trees, etc. For example, the perception system 224 may include one or more light detection and ranging (Lidar) sensors, acoustical (e.g., microphone or sonar) devices, radar units, cameras (e.g., optical and/or infrared), inertial sensors (e.g., gyroscopes or accelerometers), and/or any other detection devices that record data which may be processed by computing devices 202. The sensors of the perception system 224 may detect objects and their characteristics such as location, orientation, size, shape, type (for instance, vehicle, pedestrian, bicyclist, vegetation, etc.), heading, and speed of movement, etc. The raw data from the sensors (e.g., Lidar point clouds) and/or the aforementioned characteristics can sent for further processing to the computing devices 202 periodically or continuously as it is generated by the perception system 224. Computing devices 202 may use information from the positioning system 222 to determine the vehicle's location and the perception system 224 to detect and respond to objects when needed to reach the location safely, including planning changes to the route. In addition, the computing devices 202 may perform calibration of individual sensors, all sensors in a particular sensor assembly, or between sensors in different sensor assemblies.

As indicated in FIG. 2A, the perception system 224 includes one or more sensor assemblies 232. Each sensor assembly 232 includes one or more sensors. In one example, the sensor assemblies 232 may be arranged as sensor towers integrated into the side-view mirrors on the truck, farm equipment, construction equipment or the like. Sensor assemblies 232 may also be positioned at different locations on the tractor unit 102 or on the trailer 104, as noted above with regard to FIGS. 1A-B. The computing devices 202 may communicate with the sensor assemblies located on both the tractor unit 102 and the trailer 104. Each assembly may have one or more types of sensors such as those described above.

Also shown in FIG. 2A is a coupling system 234 for connectivity between the tractor unit and the trailer. The coupling system 234 includes one or more power and/or pneumatic connections 236, and a fifth-wheel 238 at the tractor unit for connection to the kingpin at the trailer.

Figure 2B:
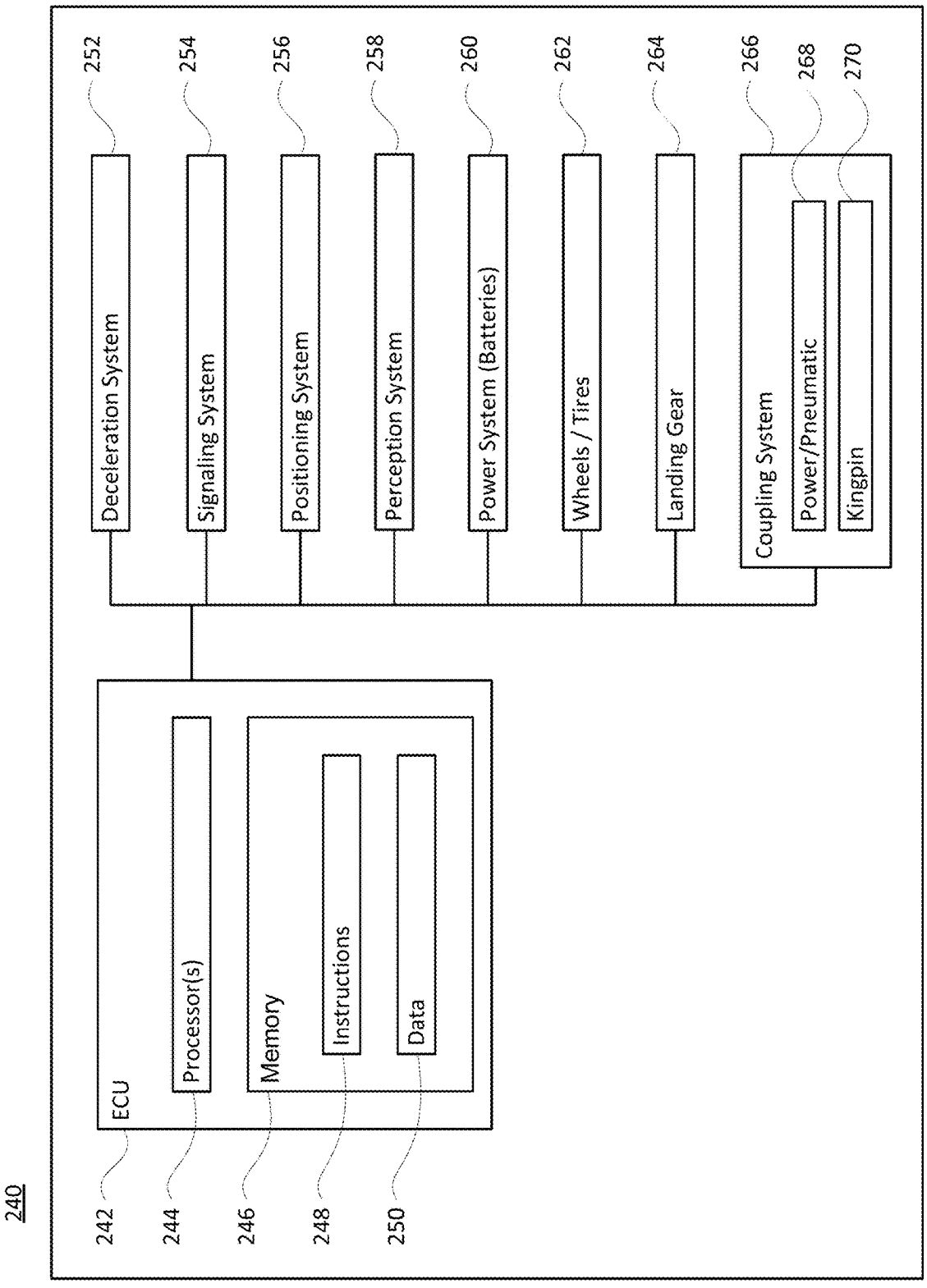
FIG. 2B illustrates a system diagram of a trailer, in accordance with aspects of the disclosure.

FIG. 2B illustrates an example block diagram 240 of a trailer. As shown, the system includes an ECU 242 of one or more computing devices, such as computing devices containing one or more processors 244, memory 246 and other components typically present in general purpose computing devices. The memory 246 stores information accessible by the one or more processors 244, including instructions 248 and data 250 that may be executed or otherwise used by the processor(s) 244. The descriptions of the processors, memory, instructions and data from FIG. 2A apply to these elements of FIG. 2B.

The ECU 242 is configured to receive information and control signals from the trailer unit. The on-board processors 244 of the ECU 242 may communicate with various systems of the trailer, including a deceleration system 252 (for controlling braking of the trailer), signaling system 254 (for controlling turn signals), and a positioning system 256 (to assist in determining the location of the trailer). The ECU 242 may also be operatively coupled to a perception system 258 with one or more sensors (for detecting objects in the trailer's environment) and a power system 260 (for example, a battery power supply) to provide power to local components. Some or all of the wheels/tires 262 of the trailer may be coupled to the deceleration system 252, and the processors 244 may be able to receive information about tire pressure, balance, wheel speed and other factors that may impact driving in an autonomous mode, and to relay that information to the processing system of the tractor unit. The deceleration system 252, signaling system 254, positioning system 256, perception system 258, power system 260 and wheels/tires 262 may operate in a manner such as described above with regard to FIG. 2A.

The trailer also includes a set of landing gear 264, as well as a coupling system 266. The landing gear provide a support structure for the trailer when decoupled from the tractor unit. The coupling system 266, which may be a part of coupling system 234, provides connectivity between the trailer and the tractor unit. The coupling system 266 may include a connection section 268 (e.g., for power and/or pneumatic links) to provide backward compatibility with legacy trailer units that may or may not be capable of operating in an autonomous mode. The coupling system also includes a kingpin 270 configured for connectivity with the fifth-wheel of the tractor unit.

While the components and systems of FIGS. 2A-B are described in relation to a tractor-trailer arrangement, as noted above the technology may be employed with other types of articulated vehicles, such as the articulate bus 120 of FIGS. 1C-D.

Example Implementations

In view of the structures and configurations described above and illustrated in the figures, various implementations will now be described.

Information obtained from one or more sensors is employed so that the vehicle may operate in an autonomous mode. Each sensor, or type of sensor, may have a different range, resolution and/or field of view (FOV).

For instance, the sensors may include a long range, narrow FOV Lidar and a short range, tall FOV Lidar. In one example, the long range Lidar may have a range exceeding 50-250 meters, while the short range Lidar has a range no greater than 1-50 meters. Alternatively, the short range Lidar may generally cover up to 10-15 meters from the vehicle while the long range Lidar may cover a range exceeding 100 meters. In another example, the long range is between 10-200 meters, while the short range has a range of 0-20 meters. In a further example, the long range exceeds 80 meters while the short range is below 50 meters. Intermediate ranges of between, e.g., 10-100 meters can be covered by one or both of the long range and short range Lidars, or by a medium range Lidar that may also be included in the sensor system. The medium range Lidar may be disposed between the long and short range Lidars in a single housing. In addition to or in place of these Lidars, a set of cameras may be arranged, for instance to provide forward, side and rear-facing imagery. Similarly, a set of radar sensors may also be arranged to provide forward, side and rear-facing data. Other sensors may include an inertial sensor such as a gyroscope, an accelerometer, etc.

Figure 3A:
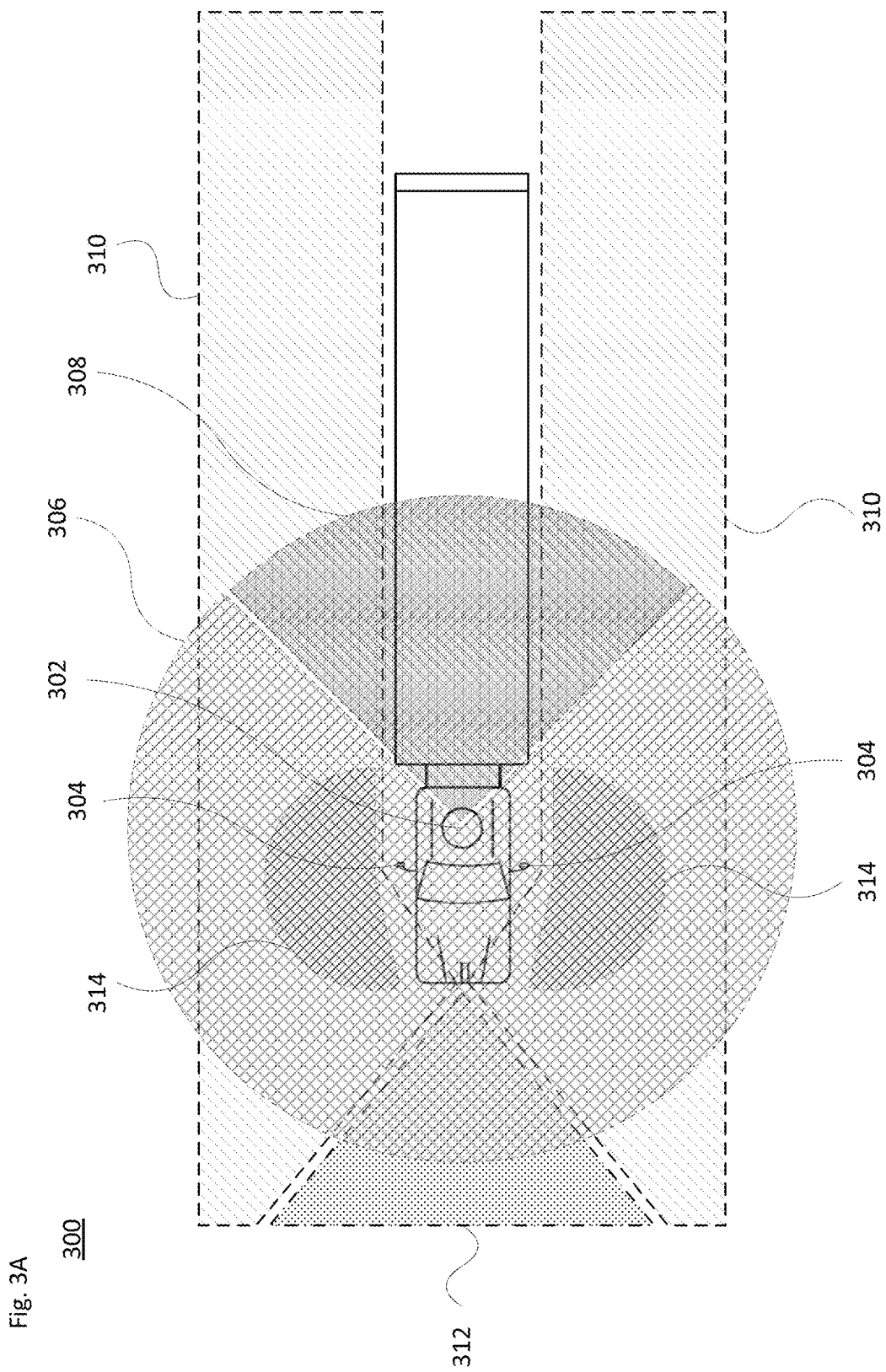
FIG. 3A is an example of sensor coverage for a vehicle in accordance with aspects of the disclosure.
Figure 3B:
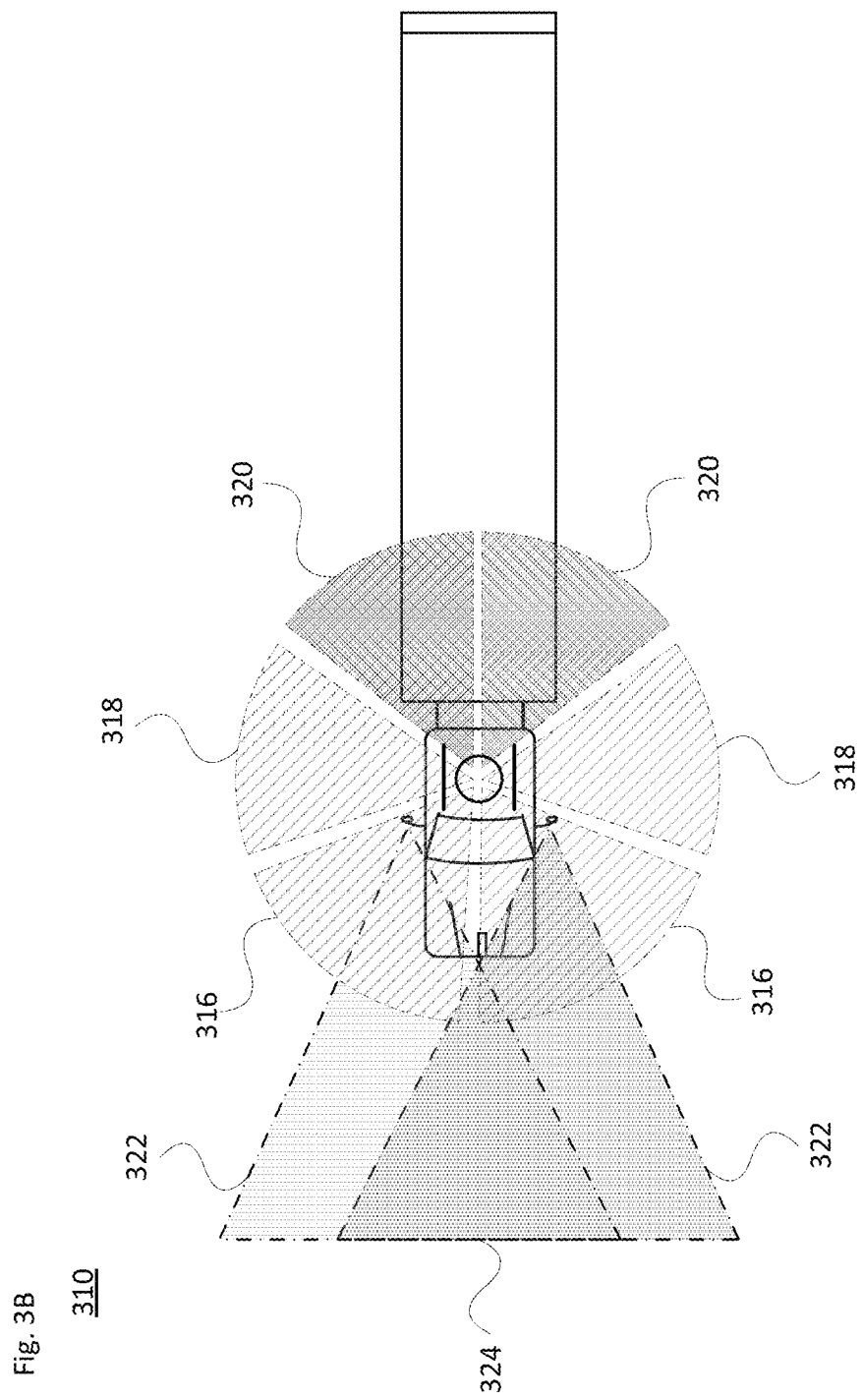
FIG. 3B is another example of sensor coverage for a vehicle in accordance with aspects of the disclosure.

Examples of Lidar, camera and radar sensors and their fields of view are shown in FIGS. 3A and 3B. In example 300 of FIG. 3A, one or more Lidar units may be located in rooftop sensor housing 302, with other Lidar units in side sensor housings 304. In particular, the rooftop sensor housing 302 may be configured to provide a 360° FOV. A pair of sensor housings 304 may be located on either side of the tractor unit cab, for instance integrated into a side view mirror assembly or along a side door or quarterpanel of the cab. In one scenario, long range Lidars may be located along a top or upper area of the sensor housings 302 and 304. The long range Lidar may be configured to see over the hood of the vehicle. And short range Lidars may be located in other portions of the sensor housings 302 and 304. The short range Lidars may be used by the perception system to determine whether an object such as another vehicle, pedestrian, bicyclist, etc. is next to the front or side of the vehicle and take that information into account when determining how to drive or turn. Both types of Lidars may be co-located in the housing, for instance aligned along a common vertical axis.

As illustrated in FIG. 3A, the Lidar(s) in the rooftop sensor housing 302 may have a FOV 306. Here, as shown by region 308, the trailer or other articulating portion of the vehicle may provide signal returns, and may partially or fully block a rearward view. Long range Lidars on the left and right sides of the tractor unit have fields of view 310. These can encompass significant areas along the sides and front of the vehicle. As shown, there may be an overlap region 312 of their fields of view in front of the vehicle. The overlap region 312 provides the perception system with additional or information about a very important region that is directly in front of the tractor unit. This redundancy also has a safety aspect. Should one of the long range Lidar sensors suffer degradation in performance, the redundancy would still allow for operation in an autonomous mode. Short range Lidars on the left and right sides have smaller fields of view 314. A space is shown between different fields of view for clarity in the drawing; however in actuality there may be no break in the coverage. The specific placements of the sensor assemblies and fields of view is merely exemplary, and may different depending on, e.g., the type of vehicle, the size of the vehicle, FOV requirements, etc.

FIG. 3B illustrates an example configuration 310 for either (or both) of radar and camera sensors in a rooftop housing and on both sides of a tractor-trailer. Here, there may be multiple radar and/or camera sensors in each of the sensor housings 302 and 304. As shown, there may be sensors in the rooftop housing with front fields of view 316, side fields of view 318 and rear fields of view 320. As with region 308, the trailer may impact the ability of the sensor to detect objects behind the vehicle. Sensors in the sensor housings 304 may have forward facing fields of view 322 (and side and/or rear fields of view as well). As with the Lidars discussed above with respect to FIG. 3A, the sensors of FIG. 3B may be arranged so that the adjoining fields of view overlap, such as shown by overlapping region 324. The overlap regions here similarly can provide redundancy and have the same benefits should one sensor suffer degradation in performance.

Figure 4:
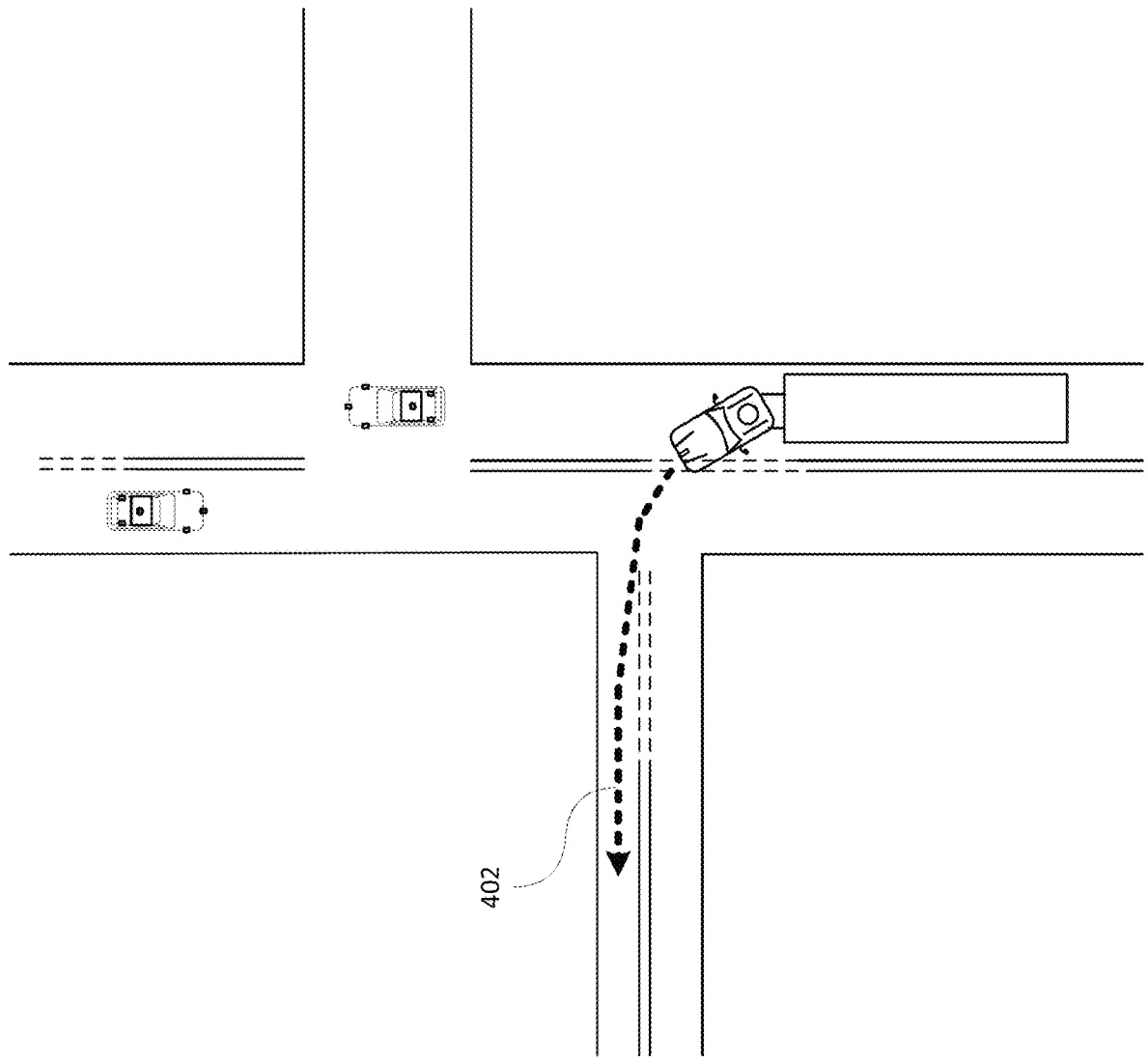
FIG. 4 illustrates a turning example vehicle in accordance with aspects of the disclosure.
Figure 5:
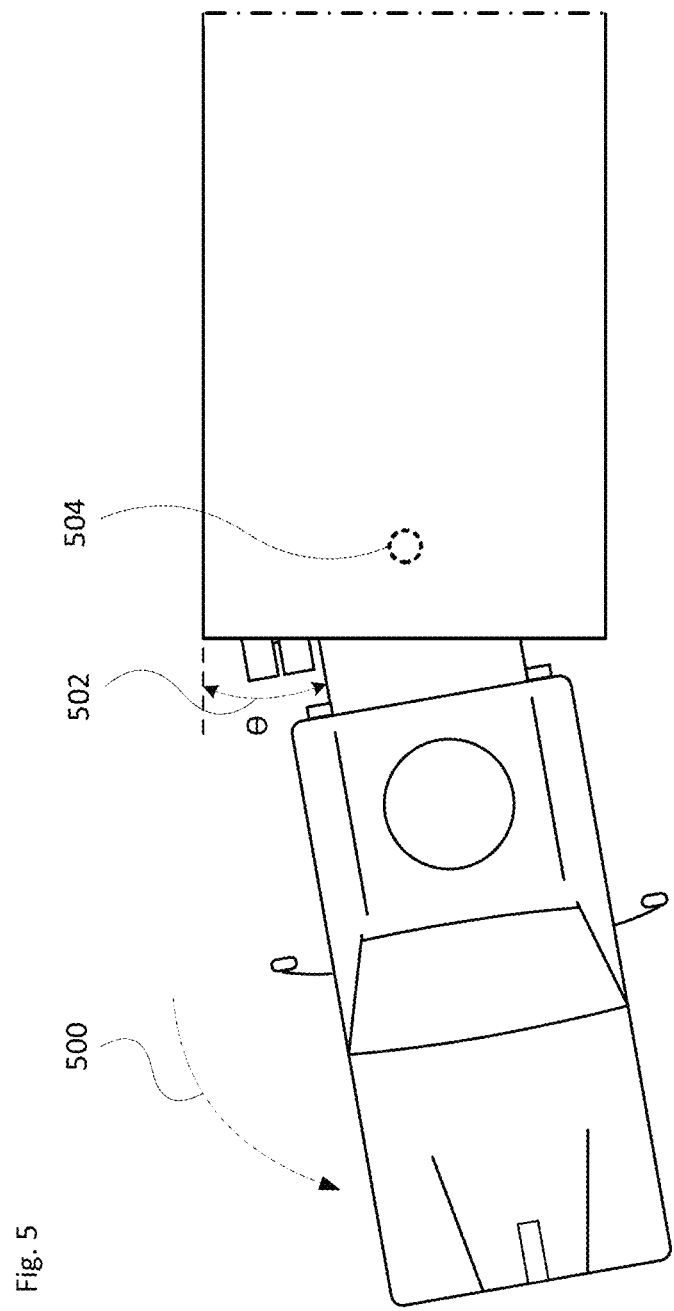
FIG. 5 illustrates aspects of turning in accordance with aspects of the disclosure.

FIG. 4 illustrates a driving scenario 400 in which the vehicle is making a turn to follow a route, as shown by dotted line 402. As noted above, it can be helpful to the on-board driving and planning system(s) to know the specific orientation between the tractor and trailer. For instance, FIG. 5 shows a left turn with dotted arrow 500, and a corresponding change in the relative orientation angle θ via double arrow 502. Dotted circle 504 indicates the location of the kingpin of the trailer, about which the pivot occurs.

One aspect of the technology employs a trailer tracking algorithm using the on-board sensor system and implemented by, e.g., processors 204 of computing devices 202, by the positioning system 222 or other elements of the system. For example, Lidar sensor data (e.g., point clouds) may be obtained from one or more Lidar sensors mounted on the roof or other locations along the tractor.

The trailer tracking algorithm has several aspects. One aspect involves estimating the orientation of the trailer relative to the tractor (e.g., with orientation angle θ) based on the received Lidar sensor data point clouds. Another aspect may include smoothing the orientation using a motion filter, such as a Kalman-type filter. Based on this, the pose of the trailer or other articulating element is derived in view of the orientation and other data about the trailer. For instance, the length and height of the trailer, the position of the hitch point (e.g., fifth wheel) and the position of the tow point (e.g., kingpin) may be taken into consideration. For purposes of this approach, it does not matter what material(s) the trailer is made of.

This approach is especially beneficial because no added hardware is required. In one example, the Lidar data is updated on the order of 10 times per second. The motion filter may update on the order of 100 times per second. In other example, the updates may be higher (e.g., 20-30 or 200-300 times per second) or lower (e.g., 5-9 or 50-90 times per second).

Another aspect involves determining whether the Lidar point cloud (or other sensor information) is returned primarily from the front face of the trailer or more predominantly from either the left side face or right side face of the trailer. While sensors such as gyroscopes and accelerometers can help the on-board computer system determine the relative orientation of the trailer to the tractor, if such sensors fail or stop reporting pose data, or otherwise suffer a degradation in accuracy, it can be challenging to quickly ascertain the orientation. Thus, this aspect involves stateless orientation estimation. Such an approach avoids having to keep an internal log of prior relative orientations or requiring that the trailer be aligned with the tractor at an initial orientation when autonomous driving commences.

Figure 6A:
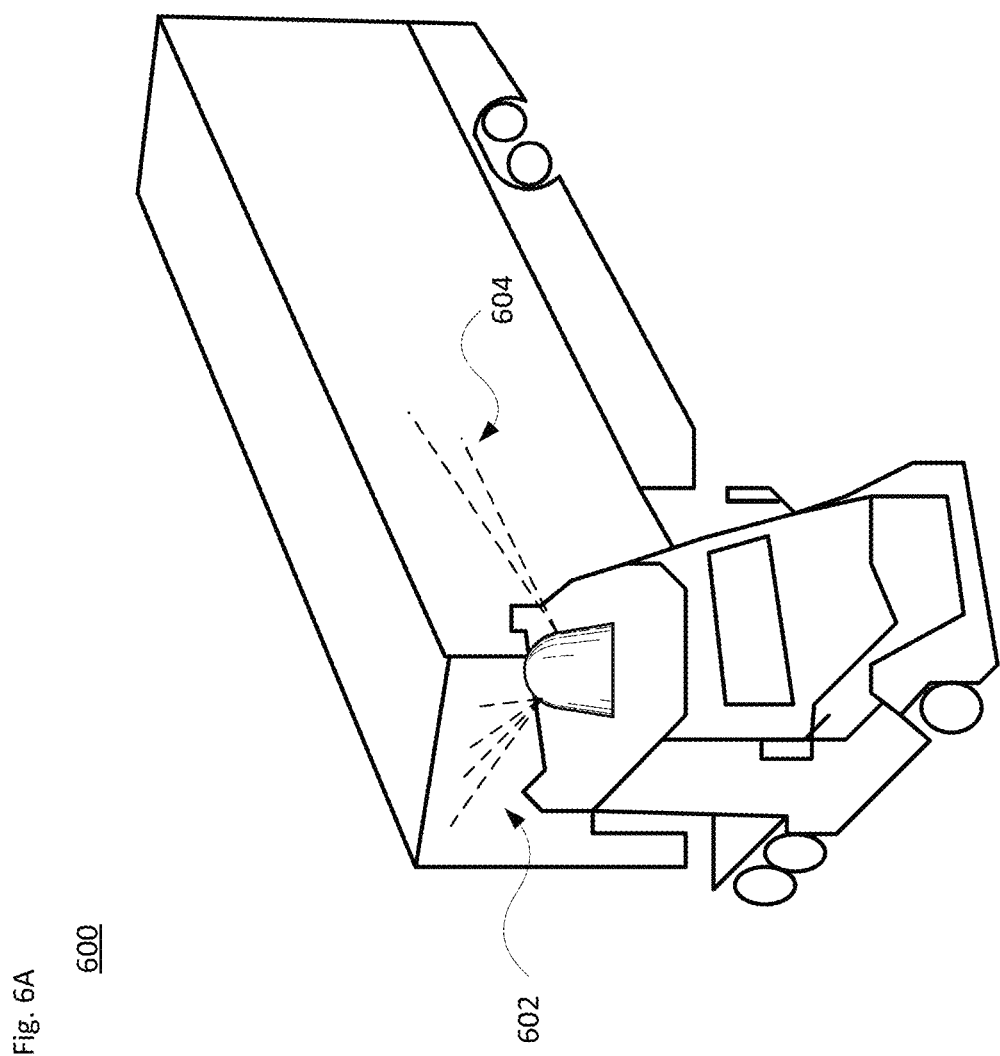

FIGS. 6A-B and 7A-B illustrate examples of how the amount of turning can affect received sensor data. FIG. 6A shows a first scenario 600 in which the vehicle is making a left turn, where the angle of the turn is not sharp, for instance less than about 30°. Here, the perception system's sensors may include a Lidar sensor that emits laser light pulses 602 and 604, which strike the front and left side of the trailer, respectively. FIG. 6B shows a second scenario 610 in which the vehicle is making a left turn, but here the angle of the turns is sharper, for instance more than about 30°, such as 45-60° or more. Here, the Lidar sensor emits laser light pulses 612 and 614, which strike the front and left side of the trailer, respectively.

Figure 7A:
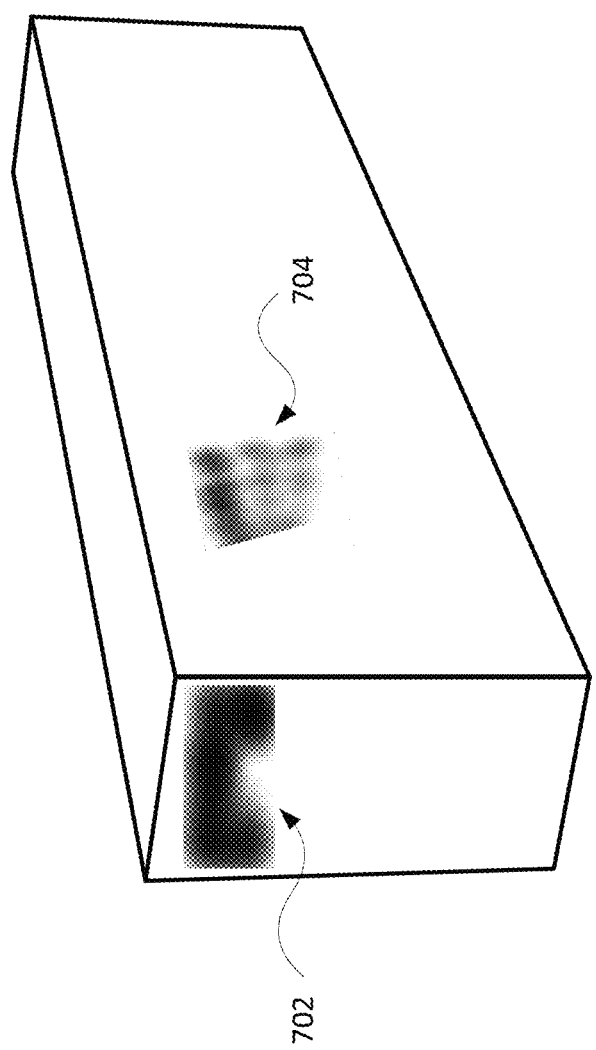
FIGS. 7A-B illustrate examples of sensor point cloud data in accordance with aspects of the disclosure.
Figure 7B:
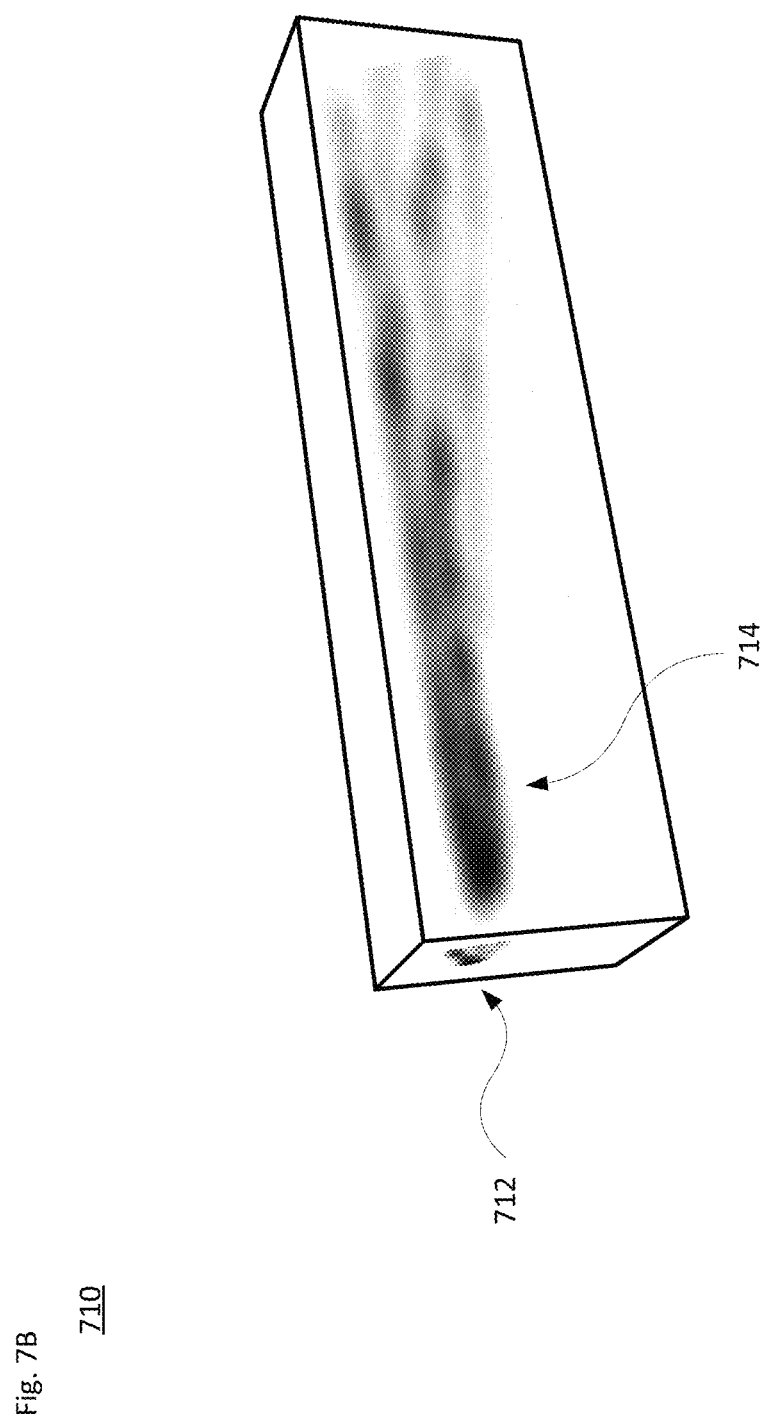

Depending on the sharpness of the turn, the placement of the sensor(s), the size and shape of the trailer, etc., the laser light pulses may strike more of the front or more of the left (or right) side of the trailer. Examples of this are shown in FIGS. 7A-B. FIG. 7A illustrates a situation 700 in which Lidar point clouds 702 and 704 are created by reflections of the laser light pulses off of the trailer. Here, point cloud 702 is along the front face of the trailer while point cloud 704 is along the left side of the trailer. Similarly, FIG. 7B illustrates a situation 710 in which Lidar point clouds 712 and 714 are created by reflections of the laser light pulses off of the front and left sides of the trailer, respectively. It can be seen that the first scenario 600 creates a pronounced point cloud 702 along the front side, while the second scenario 610 creates a pronounced point cloud 714 along the left side.

The stateless approach determines which part of the trailer (e.g., front, left side or right side) is the "major" face being returned as part of the Lidar point cloud. The major face may be considered the face for which the system computes the surface normal. For instance, if the system determines that there are two sides shot by the laser device (receiving laser returns from two sides), the system may use the amount of planarity or other criteria to select the better (e.g., more planar) side as the major face. A major face point is a point on the trailer shot by the forward beam of the Lidar. It may be an arbitrary point on the major face. The Lidar point cloud may include return signals from other parts of the trailer that are far away from the tractor (e.g., the rear corner of the trailer). Other return signals come from objects in the external environment, such as vegetation, signs, other vehicles, etc. Because the trailer is long, it may be computationally intensive to filter out return signals from vegetation or the ground.

An initial phase of the stateless technique to find the major face builds an undirected graph based on distances between points in the Lidar point cloud. By way of example, two points are connected by an edge when the distance between those points is less than a determined amount, such as within a neighborhood. By way of example only, the neighborhood may be, e.g., on the order of 20 cm, such as between 15-25 cm, or more or less. The distance may be chosen based on the point density of the laser data. For instance, if another sensor has sparser data, that value can be increased, e.g., in one example from 20 cm to 30 cm or more.

The major face is determined based on the maximally connected component. The maximally connected component containing the major face point is all the major face points. For instance, per the above 20 cm example, in the graph of points two nodes (points) are connected by an edge if and only if their distance is within 20 cm. A connected component within a graph is a subgraph where every two nodes have at least a path from one to the other. A maximally connected component is a connected component which doesn't have edges to any outside point. In one scenario, the technique may only include the points on the same plane as the major face, which is described by a major point and its surface normal. Here, using the example value above, it may be assumed that points not on the major face should be at least over 20 cm relative to it, so the maximally connected component containing the starting major face point should contain all the points on the major face, which would be the major face points.

When building the graph, the system need not use every point in the laser scan point cloud as a vertex. Rather, the system may only use points near the infinite plane defined by the major face. Therefore, the maximally connected component containing the major face point would necessarily be the major face on the trailer.

One way to build the graph is via a Voronoi diagram or k-d tree. Once the graph is built, the rest can be linearly implemented by a flood fill algorithm. Flood fill is a classic approach to obtain every maximally connected components of an undirected graph. However, building the graph this way may not efficient, for instance due to computational complexity.

Since computation time is a concern in autonomous driving scenarios, it is beneficial to efficiently extract the maximally connected component. According to an aspect of the technology, the approach may start from the major face point and expands to the entire major face one point at a time, without using complex data structures. The process includes sorting all points in the increasing order of the distance to the given major face point to form a sorted list. For instance, start with a set $S \leftarrow \{p_0\}$, where $p_0$ is the given major face point. Pick the next point $p_n$ (if any) from the sorted list. If there is no next point, the process concludes. Then remove all the points in S whose distance to $p_0$ is shorter than the distance between $p_n$ and $p_0$ minus the maximum distance between connected points. If $S=\phi$ (an empty set), the process ends. Otherwise, repeat by going through the set S until one point is closer to $p_n$ than the maximum distance between connected points. If there is such a point, add $p_n$ to S. Then repeat for the next point $p_n$. Again, once $S=\phi$, the process concludes.

The system (e.g., the processor(s) of the computing devices 202 and/or of the perception system 224 of FIG. 2) determines which surface is the major face based on all the points evaluated according to the above process. In particular, the system finds two points at the horizontal ends of the major face. While an absolute algorithm might be employed, an approximation can be used that finds the point closest to the Lidar sensor and the point farthest from the Lidar sensor. In the tractor-trailer example, based on knowledge of the trailer's physical dimensions the trailer width should be no more than 3 m, more or less. Thus, if the distance between the two points is less than a set distance, e.g., 4 m, the major face is classified as the front face. If this is the case, the process ends. However, if the major face is determined to not be the front face (e.g., the distance between the two points is greater than the set distance), the process continues. For instance, with reference to the Lidar sensor, if the closest point is to the left of the farthest point, the major face is classified as the left face; otherwise, the major face is classified as the right face. Thus, in this way the system can determine the major face for the Lidar return signals without knowing any a priori state information about the pose of the trailer relative to the tractor. While the major face approach was presented with a tractor-trailer example, the same techniques may be employed with other types of articulating vehicles when it is unclear whether the sensor data is of the front side of the articulating portion of the vehicle.

And while the above example focused on a single trailer scenario, it is possible to extent the major face approach to multiple coupled trailers. Additional Lidar sensors, for example mounted on the sides of the tractor (e.g., as shown in FIGS. 1A and 1C), can help evaluate multi-trailer pose, as well as trailer pitch and roll.

Figure 9:
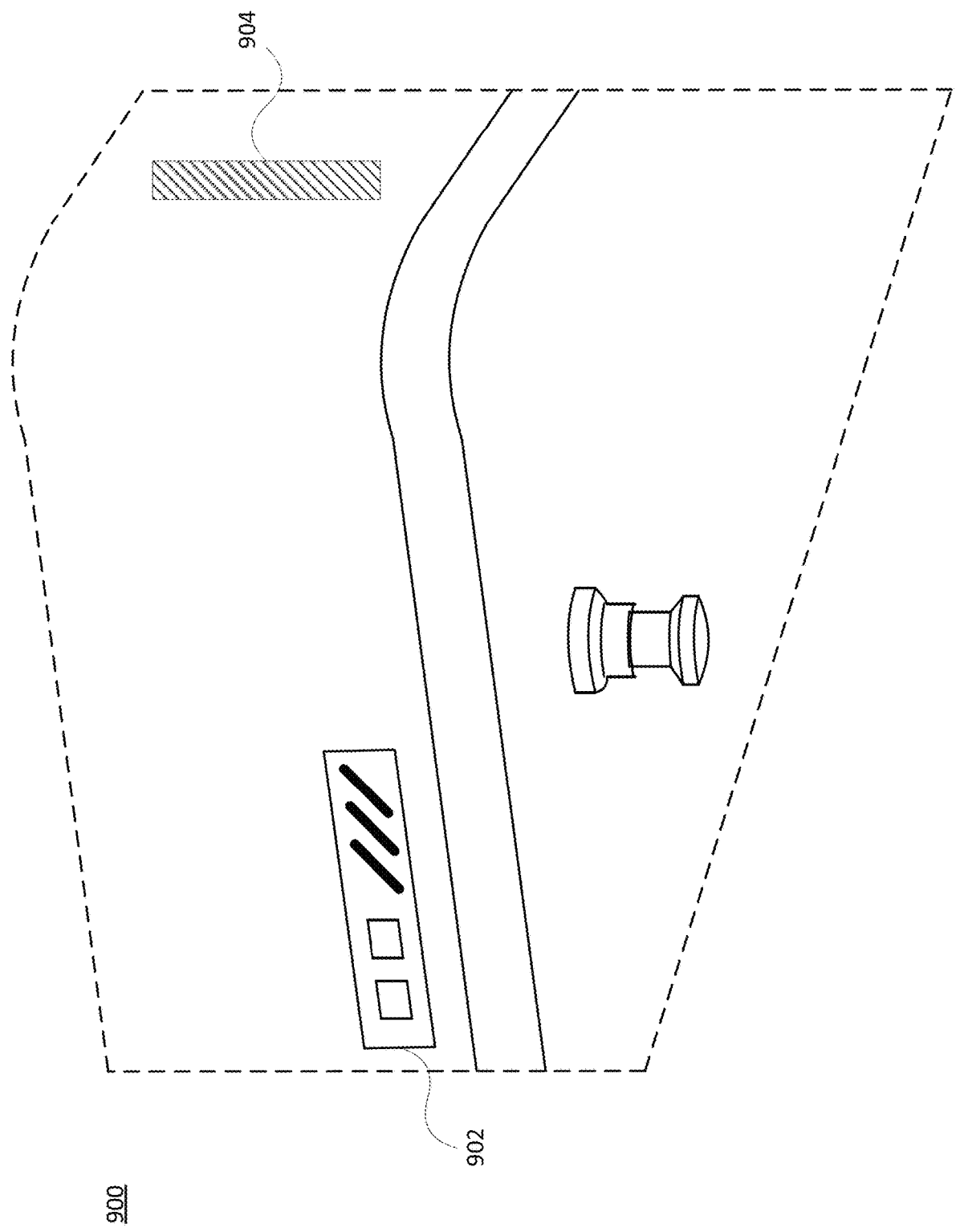
FIG. 9 illustrates examples of surface markings in accordance with aspects of the disclosure.

In addition to this, it may also be beneficial for pose estimation to place a time-of-flight camera or depth camera between the tractor and trailer (e.g., along the rear of the cab or adjacent to the fifth-wheel assembly), or between multiple connected trailers. Examples of this are shown in FIG. 8, where the camera may be located at point 800 and/or point 802. In conjunction with this, marks may be included long the front and side faces of the trailer(s). By measuring the distances between the marks in obtained images, the system can determine the pose of the trailer(s). FIG. 9 illustrates a trailer arrangement 900 with a first set of markings 902 on the front side and a second set of markings 904 on the left side. The various markings may be, by way of example only, letters, numbers, shapes, patterns (e.g., bar or QR codes), icons, etc. They may be black and white, color or greyscale.

A close-range camera image may be very robust against dirt and other things that might cover the trailer. By way of example only, each mark can be in the shape of a square, for instance with each side of the square being 10-20 cm to meters in length. The image of one mark can be enough to tell the relative roll, pitch, and yaw of the trailer in regard to the camera. In one scenario, markings would be placed on each of the front, left, and right faces of the trailer. Should the trailer make a large turn so that the marks along the front face cannot be seen, the marks on the right or left side would be visible.

FIG. 10 illustrates an example operational method 1000 for a vehicle configured to operate in an autonomous driving mode according to the above techniques. At block 1002, the system receives sensor data obtained by one or more sensors of a perception system of the vehicle. This may include one or more processors of the on-board computer system receiving the sensor data. At block 1004, the system estimates an orientation of an articulating unit coupled to a driving unit of the vehicle based on the obtained sensor data. At block 1006, the system determines a pose of the articulating unit according to the estimated orientation. And at block 1008, the system sets a driving operation in the autonomous driving mode according to the determined pose of the articulating unit. This procedure may also include other aspects, such as smoothing the estimated orientation of the articulating unit with a motion filter. In this case, the pose of the articulating unit may be determined according to the smoothed estimated orientation.

The above approaches enable the onboard computer system to evaluate Lidar and other signals reflected off of the trailer or other articulating portion of the vehicle. Accurate knowledge of the trailer's pose can be used by the computer system to effectively control the vehicle (e.g., via a planner module of the computer system) by avoiding collisions of the trailer with a nearby object. The pose information may also help the computer system detect an unsafe condition of the vehicle.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements. The processes or other operations may be performed in a different order or simultaneously, unless expressly indicated otherwise herein.

The invention claimed is:

1. A method of operating a tractor-trailer vehicle in an autonomous driving mode, the method comprising:
   receiving, by one or more processors of the vehicle from a sensor of a perception system of the vehicle, point cloud data corresponding to signal returns from a plurality of exterior surfaces of a trailer of the vehicle;
   determining, by the one or more processors based at least in part on a distance between a first one of individual points in the point cloud data that is closest to the sensor, and a second one of the individual points in the point cloud data that is farthest from the sensor, from which one of the plurality of exterior surfaces of the trailer of the vehicle a majority of the signal returns has been received;
   identifying, by the one or more processors, an orientation of the trailer relative to a tractor unit of the vehicle based on the determining from which one of the plurality of exterior surfaces of the trailer of the vehicle the majority of the signal returns has been received; and
   controlling, by the one or more processors, a driving system of the vehicle to set a driving operation in the autonomous driving mode based, at least in part, on the orientation of the trailer.

2. The method of claim 1, wherein the plurality of exterior surfaces include adjacent side surfaces of the trailer.

3. The method of claim 1, wherein the sensor is a lidar sensor, and the point cloud data is lidar point cloud data.

4. The method of claim 1, wherein the one of the plurality of exterior surfaces that receives the majority of the signal returns is a front surface or a side surface of the trailer.

5. The method of claim 1, wherein the determining from which one of the plurality of exterior surfaces of the trailer of the vehicle the majority of the signal returns has been received includes determining whether the point cloud data is returned primarily from a front face or a side face of the trailer.

6. The method of claim 1, further comprising:
   receiving sensor data of a known exterior surface of the trailer;
   using the received sensor data of the known exterior surface to identify at least one of a relative pitch, relative yaw or relative roll of the trailer; and
   determining whether to adjust the driving operation of the vehicle based on identification of the at least one of the relative pitch, relative yaw or relative roll.

7. The method of claim 1, further comprising:
   smoothing, by the one or more processors, the identified orientation of the trailer with a motion filter, wherein the driving system of the vehicle is controlled based, at least in part, on the smoothed orientation.

8. The method of claim 1, wherein the sensor of the perception system of the vehicle is a lidar sensor configured to emits laser light pulses capable of striking each of a front face and a side face of the trailer when the vehicle is making a turn.

9. The method of claim 8, wherein the side face is either a left side face or a right side face, depending on whether the vehicle is making a left turn or a right turn.

10. The method of claim 9, wherein the determining from which one of the plurality of exterior surfaces of the trailer of the vehicle the majority of the signal returns has been received is based on an angle of a turn made by the vehicle.

11. A vehicle configured to operate in an autonomous driving mode, the vehicle comprising a tractor unit including:
    a driving system including a steering subsystem, an acceleration subsystem and a deceleration subsystem to control driving of the vehicle in the autonomous driving mode;
    a perception system including a sensor configured to detect objects in an environment surrounding the vehicle;
    a coupling system configured to pivotally couple to a trailer; and
    a control system operatively connected to the driving system and the perception system, the control system having one or more processors configured to:
       receive, from the perception system, point cloud data corresponding to signal returns from a plurality of exterior surfaces of the trailer of the vehicle;
       determine, based at least in part on a distance between a first one of individual points in the point cloud data that is closest to the sensor, and a second one of the individual points in the point cloud data that is farthest from the sensor, from which one of the plurality of exterior surfaces of the trailer a majority of the signal returns has been received;
       identify an orientation of the trailer relative to the tractor unit of the vehicle based on the determination from which one of the plurality of exterior surfaces of the trailer of the vehicle the majority of the signal returns has been received; and
       control the driving system to set a driving operation in the autonomous driving mode based, at least in part, on the orientation of the trailer.

12. The vehicle of claim 11, wherein the one or more processors are further configured to:
    receive sensor data of a known exterior surface of the trailer;

use the received sensor data of the known exterior surface to identify at least one of a relative pitch, relative yaw or relative roll of the trailer; and determine whether to adjust the driving operation based on identification of the at least one of the relative pitch, relative yaw or relative roll.

13. The vehicle of claim 12, wherein the sensor data is received from a camera of the perception system.

14. The vehicle of claim 11, further comprising the trailer.

15. The vehicle of claim 11, wherein the one or more processors are configured to determine whether the point cloud data is returned primarily from a front face or a side face of the trailer.

16. The vehicle of claim 11, wherein the sensor of the perception system of the vehicle is a lidar sensor configured to emit laser light pulses capable of striking each of a front face and a side face of the trailer when the vehicle is making a turn.

17. The vehicle of claim 16, wherein the side face is either a left side face or a right side face, depending on whether the vehicle is making a left turn or a right turn.

18. The vehicle of claim 17, wherein the determination from which one of the plurality of exterior surfaces of the trailer of the vehicle the majority of the signal returns has been received is based on an angle of a turn made by the vehicle.

19. The vehicle of claim 11, further comprising a motion filter configured to smooth the identified orientation of the trailer, wherein the driving system of the vehicle is controlled based, at least in part, on the smoothed orientation.

20. A non-transitory computer readable medium storing instructions which, when executed, cause one or more processors to perform a method of operating a tractor-trailer vehicle in an autonomous driving mode, the method comprising:
   receiving from a sensor of a perception system of the vehicle, point cloud data corresponding to signal returns from a plurality of exterior surfaces of a trailer of the vehicle;
   determining, based at least in part on a distance between a first one of individual points in the point cloud data that is closest to the sensor, and a second one of the individual points in the point cloud data that is farthest from the sensor, from which one of the plurality of exterior surfaces of the trailer of the vehicle a majority of the signal returns has been received;
   identifying, an orientation of the trailer relative to a tractor unit of the vehicle based on the determining from which one of the plurality of exterior surfaces of the trailer of the vehicle the majority of the signal returns has been received; and
   controlling, a driving system of the vehicle to set a driving operation in the autonomous driving mode based, at least in part, on the orientation of the trailer.

21. The non-transitory computer readable medium of claim 20, wherein the sensor is a lidar sensor, and the point cloud data is lidar point cloud data.

* * * * *